(12) United States Patent
Sharony et al.

(10) Patent No.: US 6,925,094 B2
(45) Date of Patent: Aug. 2, 2005

(54) SYSTEM AND METHOD FOR WIRELESS NETWORK CHANNEL MANAGEMENT

(75) Inventors: Jacob Sharony, Dix Hills, NY (US); Moushumi Sen, Bangalore (IN); William Sakoda, East Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/253,005

(22) Filed: Sep. 23, 2002

(65) Prior Publication Data
US 2004/0057459 A1 Mar. 25, 2004

(51) Int. Cl.⁷ .................................................. H04J 3/16
(52) U.S. Cl. .................... 370/468; 370/412; 370/395.42
(58) Field of Search ................................. 370/468, 465, 370/473, 429, 428, 412, 413, 414, 419, 395.21, 395.4, 395.41, 395.42, 328, 338, 415, 416, 417, 392, 394, 442, 443, 444, 229, 230, 401, 359

(56) References Cited

U.S. PATENT DOCUMENTS

| | | | | |
|---|---|---|---|---|
| 5,708,656 A | * | 1/1998 | Noneman et al. | 370/335 |
| 6,212,194 B1 | * | 4/2001 | Hsieh | 370/414 |
| 6,233,236 B1 | * | 5/2001 | Nelson et al. | 370/359 |
| 2003/0023915 A1 | * | 1/2003 | Choi | 714/748 |
| 2003/0120705 A1 | * | 6/2003 | Chen et al. | 709/104 |
| 2004/0033806 A1 | * | 2/2004 | Daniel et al. | 455/450 |

* cited by examiner

Primary Examiner—Brian Nguyen
(74) Attorney, Agent, or Firm—Fay Kaplun & Marcin, LLP

(57) ABSTRACT

A method, comprising the steps of appending a data packet to a data stream queue ("DSQ"), the DSQ having a priority level, allocating a quantum of bandwidth to the DSQ and transmitting the data packet as a function of the priority level and the quantum of bandwidth.

27 Claims, 7 Drawing Sheets

SYSTEM AND METHOD FOR WIRELESS NETWORK CHANNEL MANAGEMENT

BACKGROUND OF THE INVENTION

The maturing of wireless communication networks has created a new venue for more demanding applications that require high data transfer rates with low error rates. Applications may include voice or video conferencing, which are directed to a specific mobile unit, and voice or video broadcasting, which are directed to multiple mobile units. A problem that arises is that wireless networks have a very limited bandwidth and higher data error rates than their wired cousins.

In addition, as the number of users sending data over a common channel increases, the bandwidth available to an individual data stream decreases. In the wireless environment where bandwidth is at a premium, this very quickly becomes a limiting factor to the system. Broadband and/or time sensitive data applications, though, are not practical without guaranteed bandwidth. There is, therefore, a great need for a comprehensive system that can manage the limited bandwidth of wireless networks to provide a high data rate for broadband applications without compromising error rates.

SUMMARY OF THE INVENTION

A method, comprising the steps of appending a data packet to a data stream queue ("DSQ"), the DSQ having a priority level, allocating a quantum of bandwidth to the DSQ and transmitting the data packet as a function of the priority level and the quantum of bandwidth.

In addition, a method, comprising the steps of receiving a plurality of data packets, determining a priority level for each of the data packets, appending each data packet to a data stream queue, the data stream queue corresponding to the priority level and a destination of each data packet, allocating a quantum of bandwidth to the data stream queue and transmitting each data packet as a function of the priority level and the quantum of bandwidth.

Furthermore, a system, comprising an access point ("AP") for a wireless local area network ("WLAN"), the AP appending a data packet to a data stream queue ("DSQ"), having a priority level, allocating a quantum of bandwidth to the DSQ and transmitting the data packet as a function of the priority level of the DSQ and the quantum of bandwidth and a mobile unit ("MU") receiving and processing the data packet.

An access point for a wireless local area network, comprising a plurality of priority rings, each priority ring corresponding to a priority level and a plurality of DSQs, each DSQ corresponding to one of the priority levels and a destination of data packets and residing in the priority ring corresponding to the one of the priority levels, wherein the access point appends each data packet to the DSQ corresponding to the priority level and destination of the data packet, the access point transmitting the data packets from each of the DSQs as a function of the priority level of the DSQ.

A system, comprising an access point ("AP") for a wireless local area network ("WLAN") and a mobile unit ("MU"). The AP appends a data packet to a data stream queue ("DSQ"), assigns a serial number to the data packet, transmits the data packet and saves a copy of the data packet in a buffer. The MU receives the data packet, determines the serial number of the data packet, transmits a request to the AP as a function of the serial number. The AP then receives the request, retrieves a second data packet from the buffer as a function of the serial number and transmits the second data packet.

In addition, a method, comprising the steps of appending a data packet to a data stream queue ("DSQ"), assigning a serial number to the data packet, transmitting the data packet by a first device, saving a copy of the data packet in a buffer of the first device, receiving the data packet at a second device, determining the serial number of the data packet and requesting, by the second device, an additional data packet as a function of the serial number.

DETAILED DESCRIPTION

Figure 1:
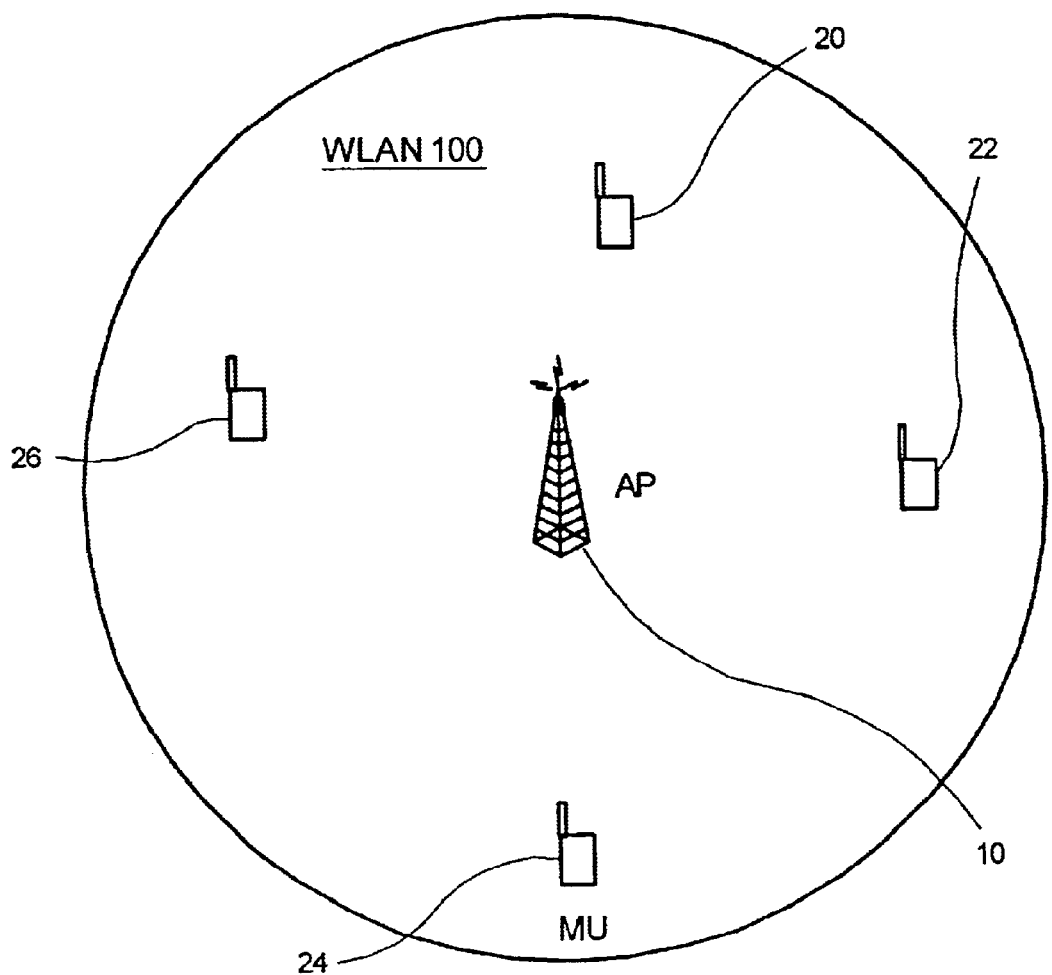
FIG. 1 shows an exemplary embodiment of a Wireless Network according to the present invention.

FIG. 1 shows an exemplary embodiment according to the present invention of a network with a Channel management system ("CMS") 1 to provide reliable broadband service. Broadband services may include, for example, high quality streaming video or audio. It may also include realtime applications such as telephony or video phones.

The CMS 1 may operate within a Wireless Local Area Network ("WLAN") 100 which may include an access point ("AP") 10 and a plurality of mobile units ("MU"s) 20–26. The WLAN may use a version of the IEEE 802.11 or a similar protocol. The MUs 20–26 may be any type of computing or processor based device such as desktop or laptop computers, personal digital assistants, mobile phones, pagers or any other device adapted to work on the WLAN 100. The AP 10 may be, for example, a router, switch or bridge that connects the wireless and wired networks. Other configurations with different numbers of MUs or APs may also be used to implement the method.

Figure 2A:
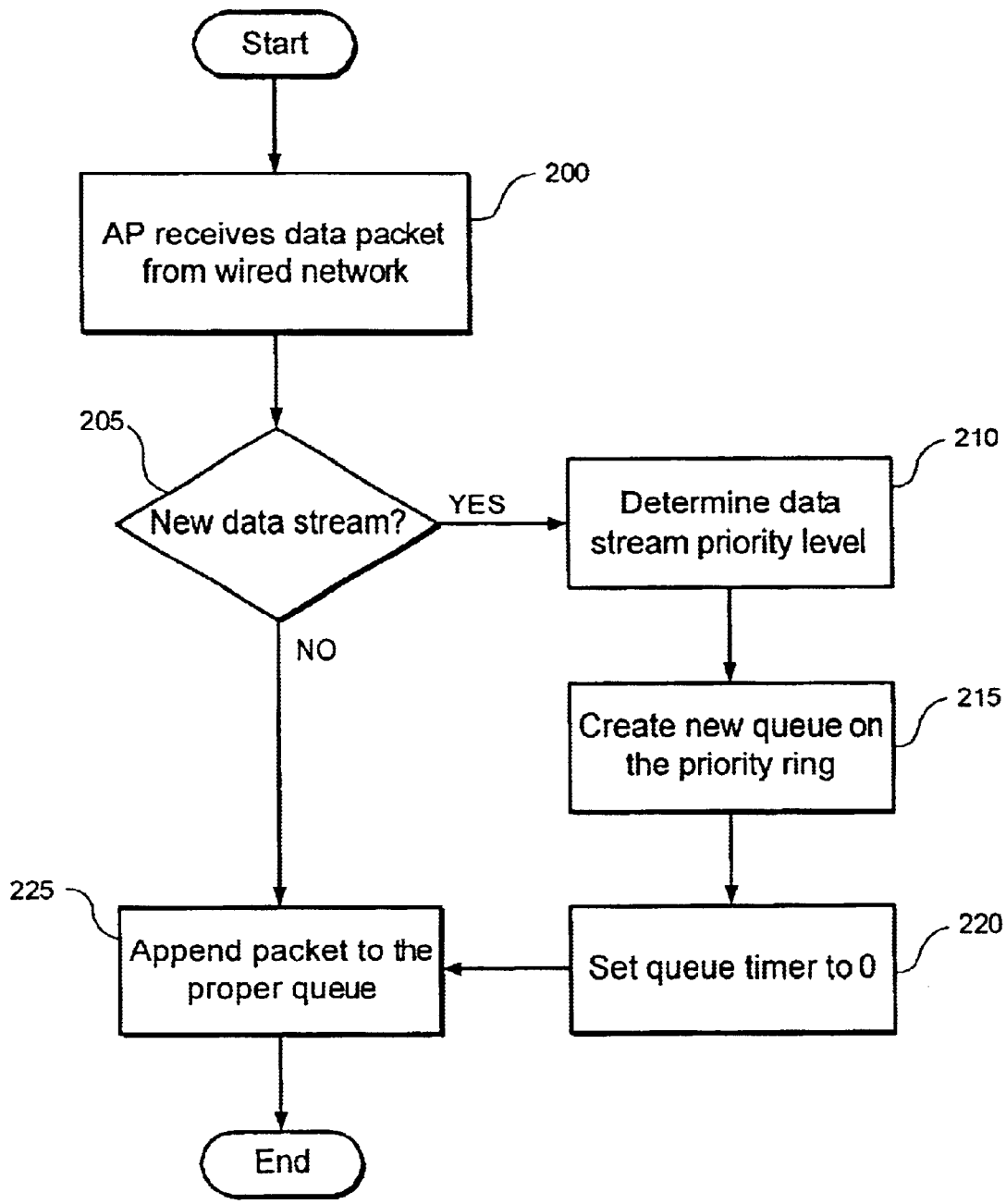
FIG. 2a shows an exemplary method of the initial data packet handling as data packets arrive at the access point according to the present invention.
Figure 2B:
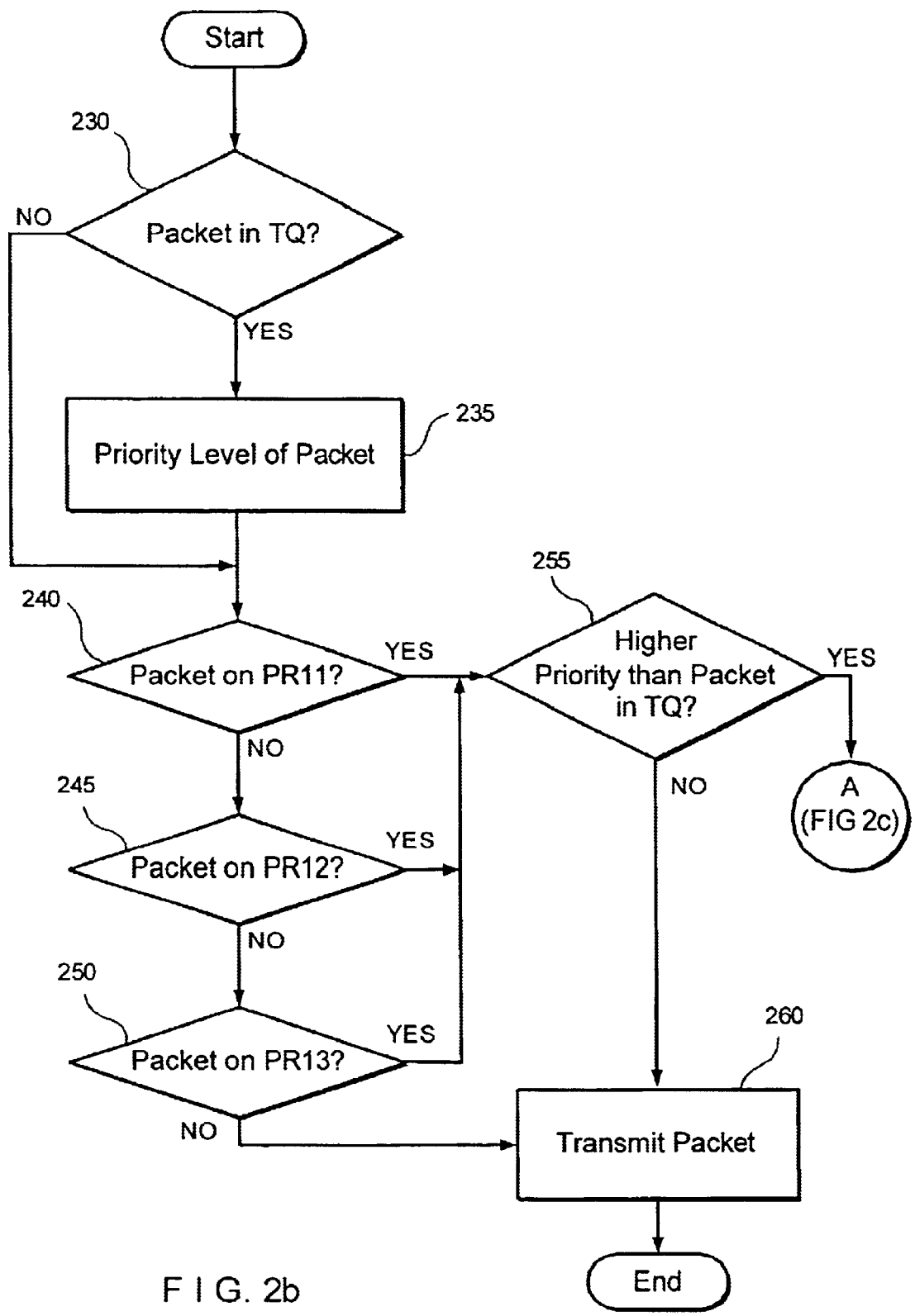
FIG. 2b shows an exemplary method for scheduling and/or servicing the priority rings according to the present invention.
Figure 2C:
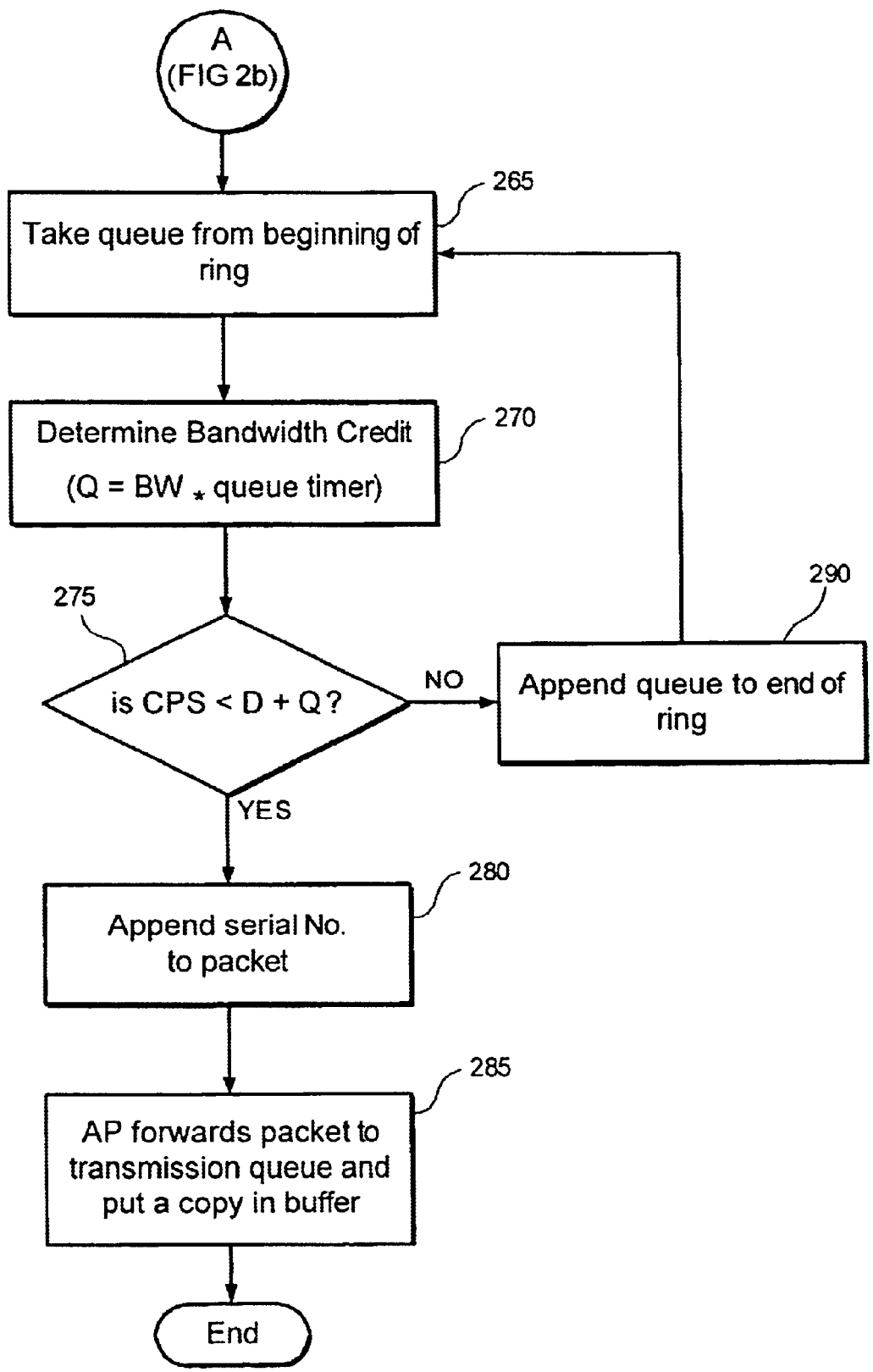
FIG. 2c shows an exemplary method of the access point managing the bandwidth of the data streams according to the present invention.
Figure 2D:
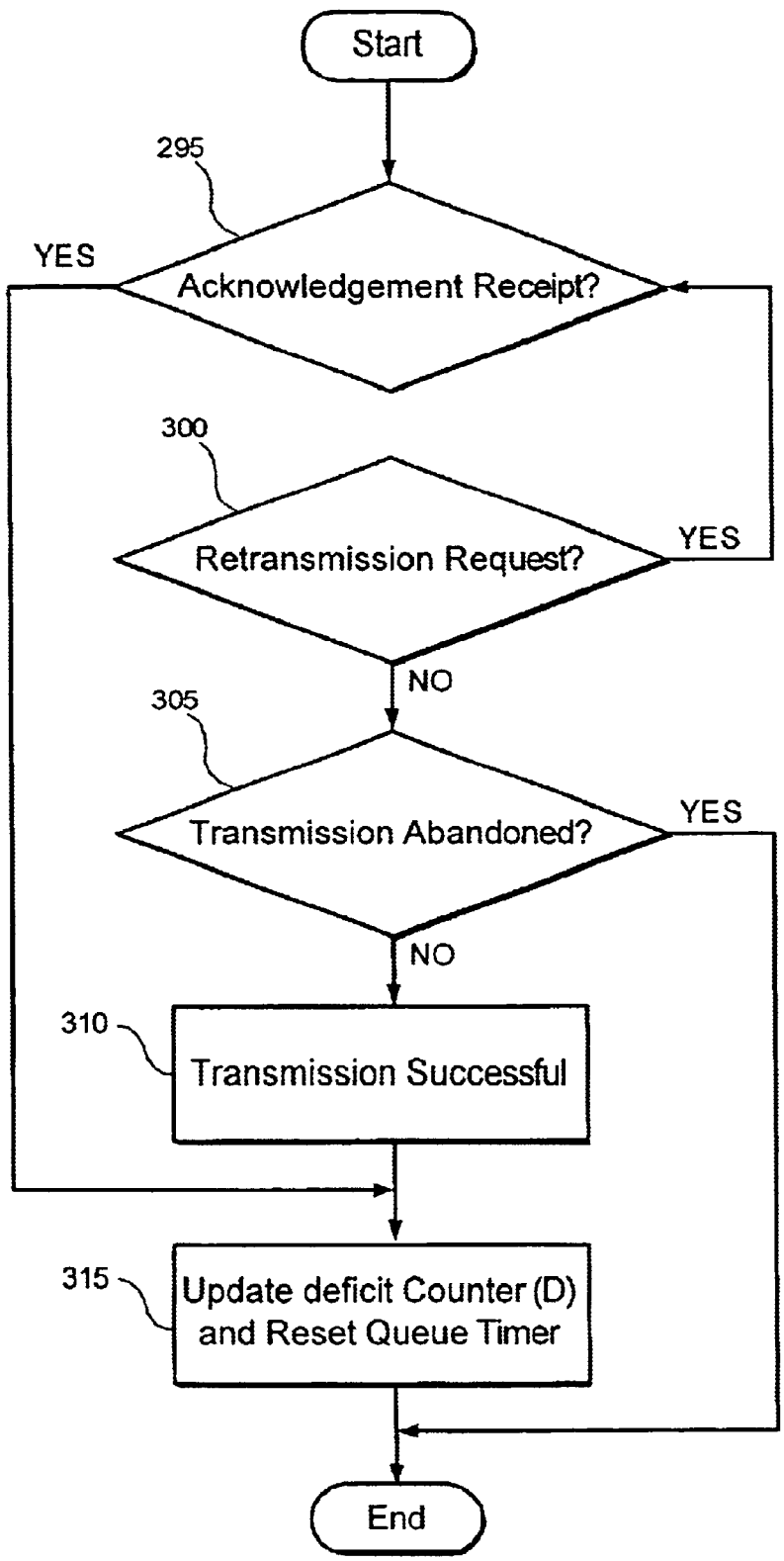
FIG. 2d shows an exemplary method for updating the deficit counter and the reset of the queue timer according to the present invention.
Figure 2E:
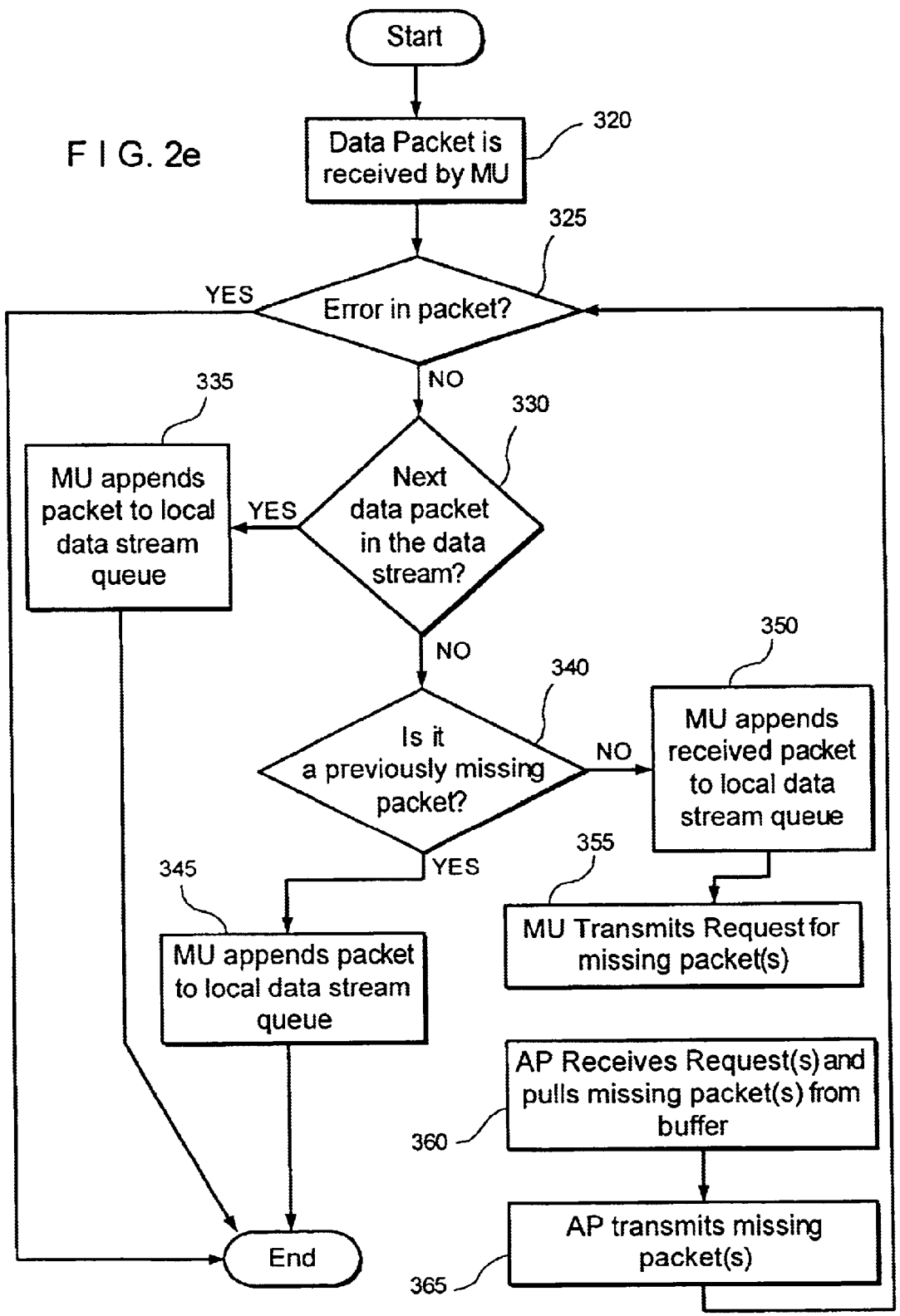
FIG. 2e shows an exemplary method of the data packet handling as the data packets arrive at the mobile unit and how packet errors are resolved according to the present invention.

FIGS. 2a, 2b, 2c, 2d and 2e show flow charts describing an exemplary method according to an exemplary embodiment of the present invention utilized to provide reliable WLAN broadband services. FIG. 2a, in particular, shows a method for the AP 10 to manage received data from the wire-line network. FIG. 2b shows an exemplary method for scheduling and/or servicing the priority rings of the exemplary embodiment. FIG. 2c illustrates a method for the AP 10 to manage the bandwidth used by each data stream. FIG. 2d shows an exemplary method for updating the deficit counter and resetting the queue timer upon successful transmission of a data packet. FIG. 2e shows a method for the MUs 20–26 to receive data packets and the interaction between the AP 10 and the MUs 20–26 to resolve packet errors. The method will be described with reference to FIG. 1 and FIG. 3.

In step 200 the AP 10 receives a data packet from the wire-line network. The wire-line network may be one that can sustain higher throughput levels than the WLAN 100. Examples of wire-line networks include a local area network ("LAN") using a protocol such as Ethernet or Token Ring or a wide area network ("WAN") using a T1 line or a fiber optic connection in a SONET ring. It is possible for the wire-line network to be a wireless connection that can work at very high data rates such as a microwave hop.

In step 205 the AP 10 checks if the packet is for a new data stream. A new data stream may be, for example, the beginning of a video download, a phone call, an email message, etc. The data stream may be addressed to one or multiple MUs 20–26.

A data packet may specify an address of a particular MU 20–26 or set of MUs 20–26, for which a data stream is already flowing. This is not an indication, though, that the incoming data packet is not for a new data stream. It is possible that the destination specified has multiple data streams addressed to it. For example, MU 20 may be downloading and playing a movie and in the interim it may receive a phone call or email message. Each communication may be considered a separate data stream.

The AP 10, therefore, may look at more than the destination address to determine whether the packet goes to an existing or new data stream. The data packet may contain additional bits which indicate the data type, e.g. video, telephone or email, and may contain a data stream identifier as well. The AP 10 may read these additional bits to determine if a queue already exists for the data stream. If the data packet is the first in the data stream then the process continues with step 210.

In step 210, after determining that the data packet is for a new data stream, the AP 10 assigns the data stream a priority level. The priority level may be based on time delay needs, which is essentially dependent on the data type. For example, a telephone connection to MU 20 may be a higher priority than a streaming video connection because a telephone connection must be delivered in real time. In contrast, realtime delivery of streaming video may not be as essential. The priority level for each of the various types of communication streams may be set in a variety of manners. For example, the priority levels may be set by the users of MUs 20–26, the system administrator of WLAN 100, etc.

The priority level may also be assigned based upon user priority. For example, the user of MU 20 may have contracted with the network service provider for a low delay and high data rate connection. In such a case, regardless of the data type, MU 20 would receive the high priority level. To illustrate, prioritizing based on the user may be useful for supplying emergency service systems with the most reliable service.

There may also be a combination of prioritizing schemes. For example, MU 20 may have contracted for a high priority connectivity only for streaming video. If this is the case then MU 20 will only be assigned a high priority connection for streaming video.

Figure 3:
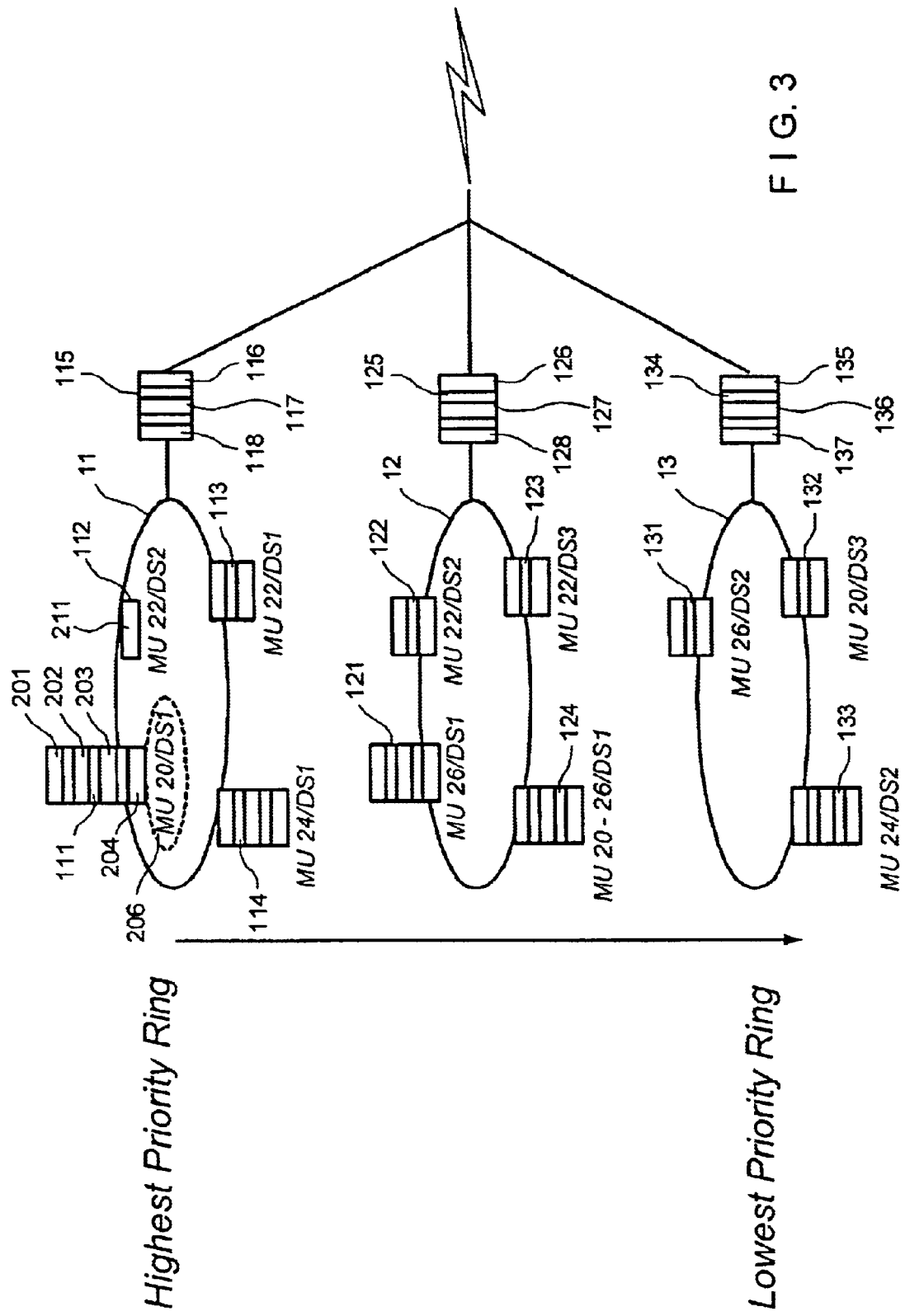
FIG. 3 shows an exemplary embodiment of the classification and prioritization scheme.

In step 215 the AP 10 creates a new queue assigned to the data stream and assigns a value for bandwidth ("BW"). The new queue is put on a priority ring ("PR"), which also may be a queue, based on the priority level determined in step 210. FIG. 3 illustrates an exemplary embodiment of the classification and prioritization scheme. There may be a plurality of PRs 11–13 each one representing a priority level. For example, the PR 11 may contain a plurality of data stream queues ("DSQ"s) 111–114 that require high priority service. Similarly, the PR 12 may contain DSQs 121–124 requiring medium priority and the PR 13 may contain low priority DSQs 131–133. The PRs 11–13 may have an associated transmission queue ("TQ") 140 where the PRs 11–13 send the data packets for actual transmission.

The DSQ 111, on the high priority ring, may contain a plurality of data packets 201–204. The DSQ 111 may also have an address 206 associated with it. The address 206 contains information that identifies the destination, e.g. MU 20, and information identifying the data stream, e.g. DS 1. The address may be contained within each data packet, so that the MUs 20–26 may determine whether a packet is addressed to them.

The DSQ 111 BW may be assigned in a similar fashion as the priority level. It may be based on data type, e.g. streaming video, email, etc., or it may be a value contracted for or assigned. The value for BW may also be tied to the PRs 11–13 and not assigned on an individual DSQ basis.

In step 220 a queue timer for the DSQ 111 is set to zero. Each DSQ 111–114, 121–124, 131–133 has its own queue timer. The queue timer for the DSQ 111 starts running immediately and its value represents the length of time since a data packet on the DSQ 111 was successfully transmitted. The queue timer is used in the next portion of the method to regulate data packet transmission.

In step 225 the received data packet is appended to the end of the proper DSQ. If the data packet is from a new data stream (steps 205–220) it is the first data packet in the queue. For example, DSQ 112 may be a new queue since there is only a single data packet 211 in the DSQ 112 (e.g. DSQ 112 is created (step 215) and the data packet 211 is the first packet appended to the DSQ 112 (step 225)).

In contrast, if the data packet is for an existing data stream (step 205), it is appended to the end of the corresponding queue. For example, assume that the data packet 204 has just been received from the wire-line network by the AP 10. The data packet 204 is placed on the bottom of the DSQ 111 and will be only transmitted by the AP 10 after the data packets 201–203. The queue data structure is used to keep the data packets 201–204 going out in the order they are placed in the queue i.e. first in first out ("FIFO"). This is the last step in the APs 10 management of incoming data packets.

The second stage of the method as shown in FIG. 2b, where the scheduling and/or servicing of the priority rings is handled, starts with step 230 where it is determined whether there is a data packet in the TQ 140. Those of skill in the art will understand that the labels for the stages of the method are only exemplary and may be carried out in a different order than which they are described. Thus, the method for loading a data packet in the TQ 140 will be described in greater detail below. The scheduling method described with reference to FIG. 2b may be carried out, for example, by a scheduling program or algorithm that is contained in the AP 10.

If it is determined that a data packet is in the TQ 140 in step 230, the method continues to step 235 where the priority level of the data packet is determined. After the priority level of the data packet in the TQ 140 is determined (step 235) or if there is no data packet in the TQ 140 (step 230), it is determined if there is a data packet waiting for transmission on the highest priority ring, which, in this example, is PR 11 (step 240). If there is a data packet on the highest priority ring (e.g., PR 11) the process continues to step 255 where it is determined whether the data packet waiting on PR 11 is a higher priority than the data packet in the TQ 140. The result of this determination will be discussed in further detail below. Those of skill in the art will understand that if there was no data packet in the TQ 140 (step 230) the determination in step 255 may be summarily skipped. The result of step 255 in this case will be positive because a data packet will always have a higher priority than no data packet.

If there is no data packet waiting on the PR 11 (step 240), the process continues to step 245 where it is determined if there is a data packet waiting for transmission on the next highest priority ring (e.g., PR 12). If there is a data packet on the PR 12 the process again continues to step 255 where it is determined whether the data packet waiting on the PR 12 is a higher priority than the data packet in the TQ 140.

If there is no data packet waiting on the PR 12 (step 245), the process continues to step 250 where it is determined if there is a data packet waiting for transmission on the next highest priority ring (e.g., PR 13). If there is a data packet on the PR 13 the process again continues to step 255 where it is determined whether the data packet waiting on the PR 13 is a higher priority than the data packet in the TQ 140. Those of skill in the art will understand that the disclosed method may continue to nest to the number of PRs that are contained in the implemented system.

Thus, if the result of any of steps 240–250 is positive, it is determined whether the data packet waiting on the PRs 11–13 is a higher priority than the data packet in the TQ 140. If the data packet waiting on the PRs 11–13 is a higher priority than the data packet in the TQ 140, the data packet in the TQ 140 will not be transmitted at that time because the waiting data packet on the PR will take precedence and that data packet will be processed in accordance with the method described wit reference to FIG. 2c which will be described in greater detail below. The original data packet having the lower priority which was in the TQ 140, may be removed and put back into the DSQ from which it came.

If the original data packet in the TQ 140 has a higher priority than any data packets waiting on the PRs or if there are no data packets waiting on the PR, the process continues to step 260 where the data packet in the TQ 140 is transmitted and the process ends. Those of skill in the art will understand that the scheduling algorithm may be separate from the hardware and/or software responsible for the actual transmission of the data packet and that the step 260 may simply be a permissive allowing the other hardware/software to transmit the data packet in the TQ 140.

In this exemplary embodiment, it may be considered that the TQ 140 contains one data packet at a time and the scheduling algorithm may continuously implement this exemplary method as new data packets are placed in the TQ 140. However, those of skill in the art will understand that the exemplary method described with reference to FIG. 2b may be implemented where the TQ 140 contains or queues multiple data packets. In such an example, the scheduling algorithm may, in addition to evaluating awaiting data packets on the PRs 11–13, it may also evaluate data packets in the TQ 140 which are further back in the queue than the present data packet.

In addition, it may be possible to implement multiple TQs (e.g., each PR having a separate TQ). For example, with reference to FIG. 3, PR 11 may be associated with TQ 140, which includes data packets 116, 117 and 118, all of which came from PR 11. Similarly, PR 12 may be associated with its own TQ 140, which includes data packets 126, 127 and 128, all of which came from PR 12. And, PR 13 may be associated with its own TQ 140, which includes data packets 135, 136 and 137. In such a case, the scheduling algorithm may evaluate the TQs (or the data packets in the TQs) by order of priority to determine from which TQ the next data packet should be transmitted.

The next stage of the method, where the AP 10 regulates data stream bandwidth usage, is described with reference to FIG. 2c and starts with step 265. As described above with reference to FIG. 2b, this stage of the method may be entered when a data packet is waiting on any one of the PRs and either the waiting data packet has a higher priority than a current data packet in the TQ 140 or there is no data packet in the TQ 140.

In step 265 the next DSQ is taken off the PR. This is the beginning of what is called a "round robin" process. One at a time, the DSQs are taken off the front of the PR. After processing they are returned to the back of the PR if any packets are left in the DSQs.

For example, if the DSQ 111 is currently at the beginning of the PR 11. The AP 10 will first look at the DSQ 111 to see if it should transmit the data packet 201. After processing the DSQ 111, the AP 10 places the DSQ 111 at the end of the PR 11. The AP 10 then repeats the process with the DSQ 112. If the AP 10 determines that the data packet in DSQ 112 should be transmitted there will be no data packets left in the DSQ 112 and it will not be placed at the end of the PR 11. The AP 10 continues through each of the DSQs (e.g., DSQ 113 and DSQ 114) until the DSQ 111 returns to the beginning of the PR 11.

In step 270 the bandwidth credit ("Q") is calculated for the DSQ taken off the ring in the previous step. The formula is Q=BW*queue_timer. The variable Q may be analogized to income owed to a worker by an employer. For example, if each week an employee makes $1,000 and has not been paid in 4 weeks then the employer owes the employee $4,000. Similarly, if a video stream to the MU 20 is assigned a 1.4 Megabits per second ("Mbps") data rate and no data packet for the data stream has been transmitted in the past 4 milliseconds (ms) the AP 10 owes the MU 20 5.6 Kilobits (1.4 Mbps*0.004 seconds) of data.

In step 275 the AP 10 determines if the next data packet on the DSQ should be transmitted by calculating whether the current packet size is less than the value of D+Q, where D is the bandwidth deficit and Q is the bandwidth credit. For example, if the DSQ 111 is the current queue and the next or current data packet is the data packet 201, then the AP 10 determines if the packet size ("CPS") of the data packet 201, is less than the bandwidth deficit ("D") plus the bandwidth credit Q. If the CPS is less than the D+Q, then the current data packet (e.g. data packet 201) may be prepared for transmission. The variable D will be explained in more detail below.

For example, if the data packet 201 is the current data packet and its size is 1 Kilobit ("Kb"), the CPS is equal to 1 Kb. If the DSQ 111 has a Q of 0.6 Kb and a D of 0.6 Kb then the CPS is less than D plus Q (1<0.6+0.6). The data packet 201, therefore, may be prepared for transmission and the process continues to step 280.

On the other hand, if CPS, i.e. size of the data packet 201, is greater than D plus Q, the AP 10 appends the current DSQ (i.e. DSQ 111) to the end of the PR 11. Continuing with the above example of a CPS of 1 Kb, but a Q of 0.5 Kb and a D of 0.3 Kb resulting in the CPS being greater than D+Q (1>0.5+0.3), then the data packet 201 will not be prepared for transmission. In this case, the process then skips to step 290 where the AP 10 appends the current DSQ (e.g. DSQ 111) to the end of the PR 11 and proceeds back to step 265 where the process is continued with the next DSQ on the PR (e.g. DSQ 112).

If it has been determined in step 245 that the next packet will be prepared for transmission, the AP 10 may append a serial number to the packet in step 280. This step is part of the process which may be used to maintain a reliable communication link. The serial number may be used by the MU in a later step to ensure that all packets are received.

The appending of a serial number in step 280 may be optional and is used in cases where there is no indication from the receiving device (e.g., the MUs 20–26) that a successful transmission has occurred from the sending device (e.g. AP 10). Such a situation may arise, for example, in the case of 802.11 multicast and broadcast data packets. In these examples, the receiving devices do not send an acknowledgment back to the AP 10. In contrast, when a receiving device successfully receives an 802.11 unicast data packet, the receiving device sends an acknowledgment back to the sending device to indicate a successful transmission. Those of skill in the art will understand that the exemplary embodiment of the present invention is applicable to data packets sent out using any protocol and other protocols may have different acknowledgment schemes for various data packets (e.g., unicast, multicast, broadcast, etc.). The appending of serial numbers by the AP 10 in step 280 will generally be carried out in those instances where an acknowledgment is not expected upon successful transmission.

Those of skill in the art will also understand that the AP 10 may not have to append serial numbers where an acknowledgment is not expected because in certain types of media formats, the data packets already contain serial numbers. In these cases, the AP 10 does not need to append serial numbers to the data packet, but to agree on the serial number scheme for the data packets with the receiving MUs 20–26.

In cases where the AP 10 carries out step 280, the value of the serial number appended may be incremented one step or value for each data packet transmitted. The value of the serial number may be a small value and within a very limited range, e.g. 0–31, so as to minimize overhead. When the serial number reaches the maximum value, e.g. 31, it may return to the initial value, e.g. 0.

In step 285 the AP 10 forwards the data packet 201 to the TQ 140 and stores a copy of it in a buffer. The buffer stores the data packet for retransmission in case the MU 20 does not receive the packet. Ideally the size of the buffer may be very limited, e.g. 20–30 data packets per data stream, because a request for retransmission should be received as soon as the MU 20 receives a subsequent data packet which is out of order from previously received data packets in the data stream. This process is described in greater detail below. However, those of skill in the art will understand that the buffer may be any size and contain any number of data packets. After the data packet is forwarded to the TQ 140, this stage of the method ends.

The next stage of the exemplary method in FIG. 2d shows the updating of the deficit counter and the reset of the queue timer upon successful transmission of a data packet. The process begins in step 295, with the AP 10 determining if it has received an acknowledgment for a transmitted data packet. If an acknowledgment has been received the process skips to step 315 where the deficit counter and the queue timer are updated. This step will be described in greater detail below. If an acknowledgment has not been received in step 295, it may be that either the receiving MU (e.g. MUs 20–26) has not yet received the transmitted data packet or, as described above, an acknowledgment is not expected for the particular data packet transmission (e.g., it is an 802.11 broadcast and/or multicast).

In this case, the process continues to step 300, where the AP 10 determines whether there has been a retransmission request for the data packet. The retransmission request may be in the form of the method which will be described below in reference to FIG. 2e or in some other form (e.g., a MAC layer retransmission request for an 802.11 unicast). If the AP 10 detects that there has been retransmission requests related to the particular data packet, the method skips back to step 295 and begins continues in accordance with the method as described.

If there has been no retransmission request, the AP 10 may determine in step 305 whether the transmission has been abandoned. For example, the AP 10 may abandon the transmission because of a faulty network connection. In such a case, the data packet will not be transmitted at all and the method ends. If the AP 10 did not abandon the transmission, the AP 10 may then determine that the data packet has been transmitted successfully (step 310). This determination may be made in a variety of manners. For example, specified period of time may have passed since the transmission. In another example, the AP 10 may have received a retransmission request for a later transmitted data packet indicating that the earlier data packet had been received. Those of skill in the art will understand that there may be variety of manners of determining that the transmission was successful.

After it is determined that the transmission was successful (step 310) or that an acknowledgment was received (step 295), the variables D and the queue timer for the particular DSQ are updated (step 315). As described above, D keeps the running balance of data transmission owed. Thus, when it is determined that a transmission was successful, it is updated for the transmission of that successful data packet. The formula used to update D is D:=D+Q−CPS. This effectively adds to D the Q plus D values not used by transmitting the current packet. The queue timer, which represents the length of time since a data packet on the DSQ was successfully transmitted, is reset to zero since there was a successful transmission. After the deficit counter and the queue timer are updated the exemplary method ends.

The variable D may be analogized to a running tab. For example, returning to the employer-employee illustration, assume that 4 weeks go by before the employer pays any amount of the employee's salary. If the salary is $1,000 per week then the employer owes $4,000 (4 weeks*$1,000 per week), this is the equivalent to Q. Then, if the employer pays the employee only $3,200 then the employer still owes $800 ($4,000–$3,200). The $800 goes on to a running tab to be added on to a paycheck in the future and is equivalent to the deficit D. Similarly, if, the DSQ 111 is a video stream to the MU 20 assigned a 1.4 Mbps data rate and no data packet has been transmitted in the past 4 ms the AP 10 owes the MU 20 5.6 Kb (1.4 Mbps*0.004 seconds) of data. If the CPS, i.e. the size of the data packet 201, is only 1 Kb then there will be a D of 4.6 Kb (5.6 Kb−1 Kb)after transmitting the data packet 201.

The next stage of the exemplary method shown in FIG. 2e illustrates the MUs 20–26 handling the incoming packets. Once again, those of skill in the art will understand that the stages of the exemplary method may occur in a different order than the order in which they are described. For example, the handling of the incoming packets by the MUs 20–26 may be occurring before or simultaneous with some of the steps of the method described with reference to FIG. 2d. In addition, the exemplary method described with reference to FIG. 2e is generally related to the receipt of those data packets which the MU 20–26 will not provide an acknowledgment back to the AP 10 that the data packet was successfully received (e.g., 802.11 broadcast and/or multicast data packets). Data packets which have an accompanying acknowledgment (e.g., 802.11 unicast data packets) may be handled in a different manner with respect to retransmission requests.

This stage begins in step 320 with the MU 20 receiving the data packet from the AP 10. The WLAN 100 may use a common channel to communicate, thus, the MUs 20–26 may constantly monitor the channel for data packets addressed to them. The MU 20 may have multiple addresses and data streams. For example, MU 20 may receive a multicast streaming video that is also going to MUs 22–26, and at the same time MU 20 may have an ongoing telephone call. In this step the MU 20 determines whether the packet is addressed to it and to which data stream it belongs.

In step 325 the MU 20 checks the received data packet for errors. This may be done for example, by using Cyclic Redundancy Checking ("CRC") a method which is implemented in the 802.11 protocol. Those of skill in the art will understand that there are multiple other methods of error checking. If there are no errors in the packet, then the process continues with step 330, otherwise the packet is discarded because it cannot be interpreted properly and the process ends.

In step 330 the MU 20 determines if the data packet is the next one in the data stream. This determination may be made, for example, as a function of the serial number appended by the AP 10 to the data packet or the serial number contained in agreed upon by the AP 10 and the MU 20. Using the example of the AP 10 appending serial numbers to the data packets, if the data packet 201 on the DSQ 111 is assigned a serial number of 10 and transmitted and the next data packet 202 on the DSQ 111 may be assigned a serial number of 11. When the MU 20 receives the data packet 202 it checks the serial number and determines that it has a serial number 11. If, in this exemplary implementation, a serial number 11 is expected after 10 the MU 20 determines that the data packet 202 is the next one in the data stream.

If the MU 20 determines that the data packet received is the next data packet in the data stream then the process continues with step 335. In this step the MU 20 appends the data packet to a local DSQ. The local DSQ is necessary to deliver the packets to the higher level network layers in the order that they were sent out. The higher level network layers receive and process the data packets for the MU 20. The process for receiving the data packet ends at this point.

On the other hand, there may be a case where a data packet goes missing. For instance, there may be errors in the data packet 202 which cause it to be thrown out by the MU 20 in step 300 or the data packet 202 may not be received at all by the MU 20.

The following example illustrates how the MU 20 determines a data packet is missing. Continuing with the example of when the data packet 201 on the DSQ 111 having an assigned serial number of 10 and the next data packet 202 having an assigned serial number of 11. Then, the data packet 203 may be assigned a serial number of 12. The MU 20 may receive data packet 201 and the next data packet received may be data packet 203. When the MU 20 receives the data packet 203 it checks the serial number and determines that it is 12. If, in this exemplary implementation, a serial number 11 is expected after 10 the MU 20 knows that the data packet 203 is not the next one in the data stream.

The process then continues with step 340 where the MU 20 determines whether the received packet is one that was previously missing. For example, assume the MU 20 receives the data packet 203 with serial number 12 when it was expecting a data packet with serial number 11. The MU 20 will then check its previous requests for missing data packets that have not yet been fulfilled. The process for making retransmission requests will be discussed in greater detail below.

If there was an outstanding retransmission request for the data packet with serial number 12 the process continues with step 345. In this step the data packet is appended to a local DSQ. The MU 20 maintains a local DSQ for each data stream. The local DSQ in an MU which is expecting a retransmission of missing data may be organized to accept serial numbered data which may, in some instances, arrive out of order. For example, the local DSQ may reserve slots for the next K arriving data packets, as the data packets arrive at the local DSQ, they are filled into the designated slot based on their serial number. Each slot may include state information such as successful receipt and awaiting transit up the network stack, missing and requiring a retransmission request, missing and waiting for arrival of a retransmission, etc. In this manner, the higher level network layers receive the packets in the correct order for processing. The process for receiving a particular data packet ends at this point.

If it was determined in step 340 that the data packet was not received based on a retransmission request, the process continues to step 350 where the MU 20 appends the received packet on to the DSQ. Even though the current packet was received out of order it may be appended to the local DSQ for safekeeping (e.g. inserted into the slot reserved for that data packet).

In step 355 the MU 20 transmits a request to the AP 10 to resend the missing data packet. The request may specify the serial number of the missing packet and the data stream address so that the AP 10 knows which data packet to resend. Continuing with the above example, the MU 20 after receiving data packet 203 with serial number 12 may request the serial number 11 data packet which it did not receive. The interference that can cause missing data packets may continue for a period of time causing several packets in a row to go missing. Depending on how the system is setup the MU 20 may send one request for all the missing packets or multiple requests, one for each data packet missing.

In step 360 the AP 10 receives the request to resend the missing data packet. The AP 10 may determine the data packet to send as a function of the serial number and data stream address. The AP 10 may retrieve the data packet from the buffer.

In step 365 the AP 10 transmits the missing data packet. The AP 10 may prioritize the transmission of the requested missing data packet differently then described above for incoming data stream packets. The missing data packet has already been delayed by the failed transmission, therefore, it may be given higher priority. For example, the missing data packets may be placed on the highest priority PR regardless of the initial priority of the data packet, it may get placed at the front of the TQ, it may append it to the front of the DSQ for the corresponding data stream at the AP 10, etc. Additionally, it may be set that the transmission of the missing data packet does not affect or is affected by the variables Q, D, queue timer or BW. Alternatively, the missing data packet may be sent immediately, bypassing the "round robin" process. If the data stream is a multicast type the retransmission of the data packet may be directed to only the MU which is missing the data packet or to all the MUs to which it was originally directed. At this point the process returns to step 325 for the MU 20 to process the next incoming data packet.

The present invention has been described with reference to an embodiment having four MUs 20–26, the WLAN 100 and the AP 10. One skilled in the art would understand that the present invention may also be successfully implemented, for example, for a plurality of APs 10 and a plurality of the WLANs 100. Accordingly, various modifications and changes may be made to the embodiments without departing from the broadest spirit and scope of the present invention as set forth in the claims that follow. The specification and drawings are accordingly to be regarded in an illustrative rather than restrictive sense.

What is claimed is:

1. A method, comprising the steps of:
   appending a first data packet to a first data stream queue ("DSQ") and a second data packet to a second data stream queue, each of the data stream queues corresponding to a priority level and a destination of each data packet, the first data packet having a first priority level and the second data packet having a second priority level;
   allocating a quantum of bandwidth to each of the DSQs;
   loading the first and second data packets into a transmission queue ("TQ");
   comparing the first and second priority levels; and
   transmitting the first and second data packets as a function of the first and second priority levels and the quantum of bandwidth, wherein the first and second data packets are transmitted when a sum of a bandwidth credit and a bandwidth deficit is one of greater and equal to a size of the data packet to be transmitted.

2. The method according to claim 1, wherein the first priority level is determined as a function of a data type.

3. The method according to claim 1, wherein the quantum of bandwidth is determined as a function of one of a data type and a user receiving the data packet.

4. A method, comprising the steps of:
   receiving a plurality of data packets;
   determining a priority level for each of the data packets;
   appending each data packet to a data stream queue, the data stream queue corresponding to the priority level and a destination of each data packet;
   allocating a quantum of bandwidth to the data stream queue;
   loading each data packet into a transmission queue ("TQ");
   comparing the priority level of each data packet in the TQ; and
   transmitting each data packet as a function of the priority level and the quantum of bandwidth, wherein each of the data packets are transmitted when a sum of a bandwidth credit and a bandwidth deficit is one of greater and equal to a size of the data packet to be transmitted.

5. The method according to claim 4, wherein the data packets of a higher priority level are transmitted before those of a lower priority level.

6. The method according to claim 4, further comprising the step of:
   creating a new data stream queue to correspond to the priority level and destination of one of the data packets.

7. A method, comprising the steps of:
   receiving a plurality of data packets;
   determining a priority level for each of the data packets;
   appending each data packet to a data stream queue, the data stream queue corresponding to the priority level and a destination of each packet;
   allocating a quantum of bandwidth to the data stream queue;
   setting a value for a timer corresponding to a data stream queue to an initial value;
   incrementally increasing the value of the timer;
   determining a bandwidth credit value by multiplying the value of the timer by the quantum of bandwidth assigned to the data stream queue;
   determining a bandwidth deficit value;
   determining whether a size of a next data packet in the data stream queue is less than the bandwidth credit value plus the bandwidth deficit value;
   permitting the next data packet in the data stream queue to be transmitted if the size of the next data packet is less than the bandwidth credit value plus the bandwidth deficit value; and
   transmitting each data packet as a function of priority level and the quantum of bandwidth.

8. A system, comprising:
   an access point ("AP") for a wireless local area network ("WLAN"), the AP receiving a plurality of data packets, appending each of the data packets to a data stream queue ("DSQ"), the data stream queue corresponding to a priority level and a destination of each data packet, each of the data packets having a priority level, allocating a quantum of bandwidth to the DSQ, loading each of the data packets into a transmission queue ("TQ"), comparing the priority level of each of the data packets in the TQ, and transmitting each of the data packets as a function of the priority level of the DSQ and the quantum of bandwidth, wherein each of the data packets is transmitted when a sum of a bandwidth credit and a bandwidth deficit is one of greater and equal to a size of the data packs to be transmitted; and
   a mobile unit ("MU") receiving and processing each of the data packs.

9. An access point for a wireless local area network, comprising:
   a plurality of priority rings, each priority ring corresponding to a priority level; and
   a plurality of data stream queues (DSQs), each DSQ corresponding to one of the priority levels and a destination of data packets and residing in the priority ring corresponding to the one of the priority levels, wherein the access point appends each data packet to the DSQ corresponding to the priority level and destination of the data packet, the access point loads each data packet into a transmission queue ("TQ"), the access point compares the priority of levels of each data packet in the TQ, and the access point transmits the data packets from the TQ as a function of the priority level of the DSQ and a quantum of bandwidth assigned to the DSQ, wherein each of the data packets are transmitted when a sum of a bandwidth credit and a bandwidth deficit is one of greater and equal to a size of the data packet to be transmitted.

10. The access point according to claim 9, further comprising:
    a buffer configured to store each data packet prior to the transmission of each data packet.

11. The access point according to claim 9, wherein one of the DSQs includes a plurality of data packets and the data packets are transmitted on a first in-first out basis.

12. The access point according to claim 9, wherein each priority ring is assigned a bandwidth and the data packets from the DSQs residing in each priority ring are transmitted as a function of the assigned bandwidth.

13. The access point according to claim 9, wherein a first data packet of a first DSQ on a first priority ring is transmitted, the first DSQ is moved to be the last DSQ on the first priority ring, and a first data packet of a subsequent DSQ on the first priority ring is transmitted.

14. An access point for a wireless local area network, comprising:

a plurality of priority rings, each priority ring corresponding to a priority level; and a plurality of data stream queues (DSQs), each DSQ corresponding to one of the priority levels and a destination of data packets and residing in the priority ring corresponding to the one of the priority levels, wherein the access point appends each data packet to the DSQ corresponding to the priority level and destination of the data packet, the access point loads each data packet into a transmission queue ("TQ"), the access point compares the priority of levels of each data packet in the TQ, and the access point transmits the data packets from the TQ as a function of the priority level of the DSQ, wherein each DSQ includes a timer, the timer being set to an initial value and incrementally counting until a data packet from the DSQ is transmitted, thereby resetting the timer to the initial value, the access point using a time counted to determine a bandwidth credit for the DSQ.

15. A system, comprising:

an access point ("AP") for a wireless local area network ("WLAN");

a mobile unit ("MU");

wherein the AP appends a first data packet to a first data stream queue ("DSQ") and a second data packet to a second data stream queue, each of the data stream queues corresponding to a priority level and a destination of each data packet, the first data packet having a first priority level and the second data packet having a second priority level;

wherein the AP loads the first and second data packets into a transmission queue ("TQ"), wherein the AP compares the first and second priority levels;

wherein the AP assigns a serial number to the first data packet;

wherein the AP transmits the first data packet when a sum of a bandwidth credit and a bandwidth deficit based on a quantum of bandwidth assigned to the DSQ is one of greater and equal to a size of the data packs;

wherein the AP saves a copy of the first data packet in a buffer;

wherein the MU receives the first data packet;

wherein the MU determines the serial number of the first data pack;

wherein the MU transmits a request to the AP as a function of the serial number;

wherein the AP receives the request;

wherein the AP retrieves an additional data packet from the buffer as a function of the serial number;

wherein the AP transmits the additional data packet.

16. The system of claim 15:

wherein the AP allocates the quantum of bandwidth to the DSQ; and wherein the AP transmits the data packet as a function of the priority level and the quantum of bandwidth.

17. The system of claim 15, wherein the MU appends the first data packet to a local DSQ; and wherein the MU sorts the local DSQ as a function of the first data packet serial number.

18. The system of claim 15, wherein the WLAN uses the IEEE 802.11 network protocol.

19. The system of claim 15, wherein the MU is one of a personal digital assistant and a computer and a mobile phone.

20. The system of claim 15:

wherein the AP determines if the first data packet is addressed to a new data stream prior to appending to the DSQ; and wherein the AP creates the DSQ if the first data packet is addressed to the new data stream prior to appending to the DSQ.

21. A method, comprising the steps of:

appending a first data packet to a first data stream queue ("DSQ") and a second data packet to a second data stream queue, each of the data stream queues corresponding to a priority level and a destination of each data packet, the first data pack having a first priority level and the second data packet having a second priority level;

assigning a serial number to each of the first data packet and the second data packet;

loading the first and second data packets into a transmission queue ("TQ");

comparing the first and second priority levels;

transmitting the first data packet by a first device when a sum of a bandwidth credit and a bandwidth deficit based on a quantum of bandwidth assigned to the DSQ is one of greater and equal to a size of the data packet;

saving a copy of the first data packet in a buffer of the first device;

receiving the first data packet at a second device;

determining the serial number of the first data packet; and requesting, by the second device, an additional data packet as a function of the serial number.

22. The method of claim 21, further comprising the steps of:

allocating, by the first device, the quantum of bandwidth to the data stream queue;

wherein the transmitting step includes transmitting the data packet as a function of the first and second priority levels and the quantum of bandwidth.

23. The method of claim 21, wherein the first device is an access point for a Wireless Local Area Network.

24. The method of claim 21, wherein the second device is one of a personal digital assistant and a computer and a mobile phone.

25. The method of claim 21, further comprising the steps of:

appending the first data packet to a local DSQ by the second device; and sorting the local DSQ as a function of the first data packet serial number.

26. The method of claim 21, further comprising:

transmitting, by the first device, the additional data packet, where the additional data packet is retrieved from the buffer.

27. The method of claim 21, further comprising the steps of:

receiving the additional data packet by the second device; and appending the additional data packet to a local data stream queue.

* * * * *